United States Patent Office 3,210,001
Patented Oct. 5, 1965

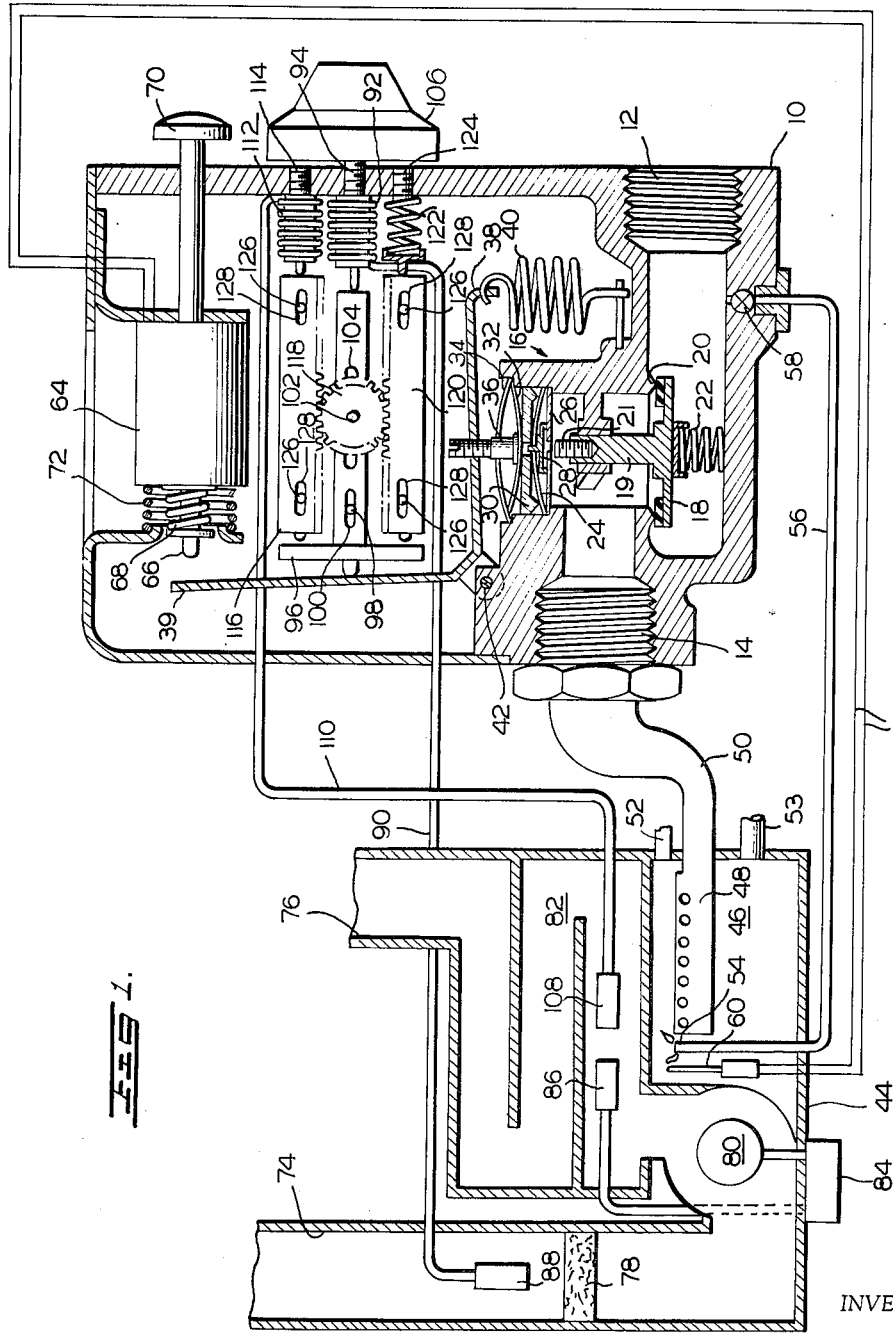

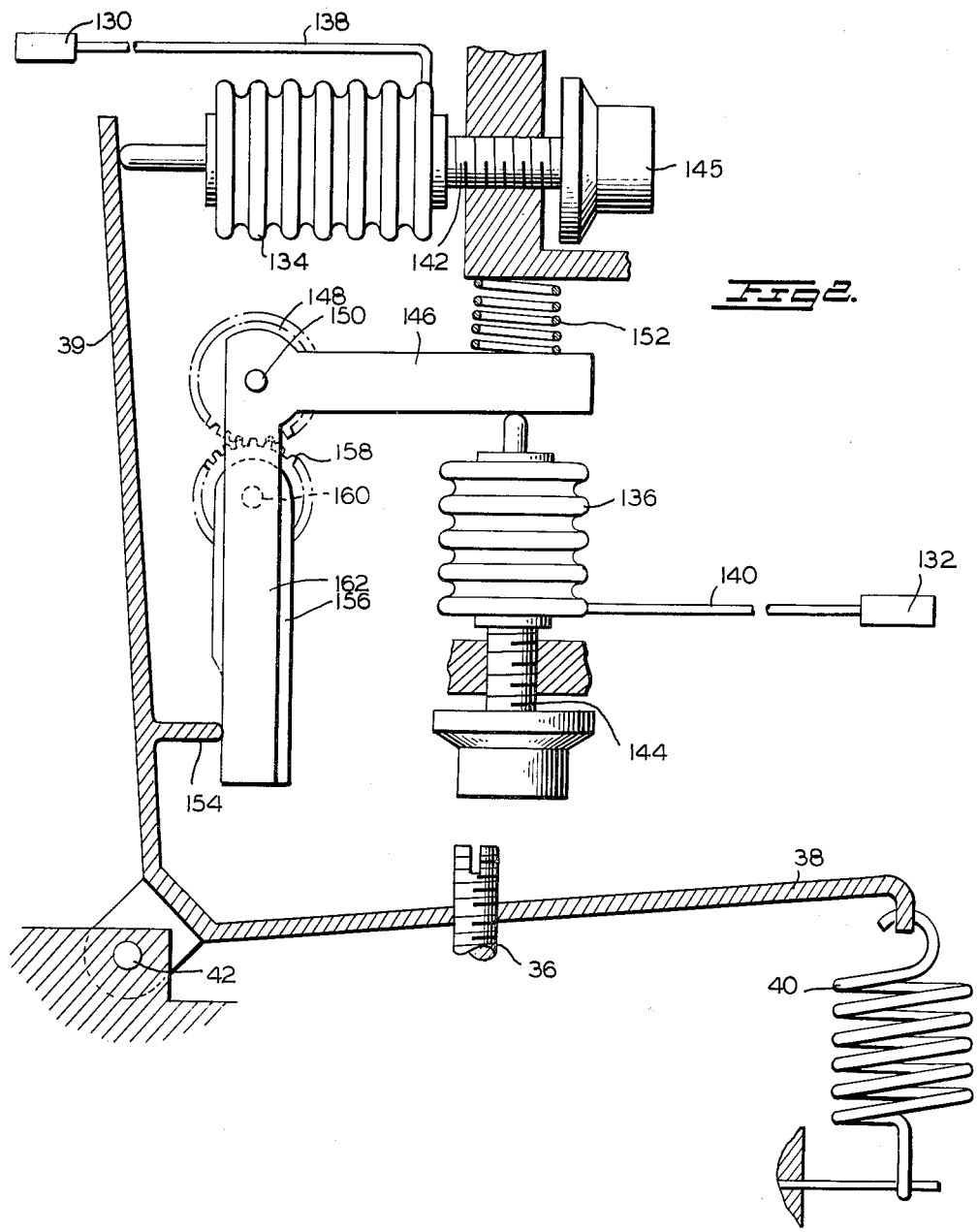

3,210,001
THERMOSTATIC CONTROL DEVICE
William J. Russell, Malvern, Pa., assignor to Robertshaw Controls Company, a corporation of Delaware
Filed Feb. 27, 1962, Ser. No. 175,987
9 Claims. (Cl. 236—9)

The present invention relates to thermostatically controlled heating units, and is particularly directed toward mechanisms for regulating flow of fuel in said units.

Regulation of flow of fuel, such as a combustion gas, in heating equipment normally envisions utilization of temperature sensitive means effecting retardation of the combustion process when a desired upper temperature limit is reached, with subsequent temperature decrease producing increased gas flow stimulating combustion. Combustion stimulating conditions produced when a lower temperature limit is reached may also arise as a result of breakdown of some element of the control mechanism, thereby giving rise to the potentiality of a runaway combustion process. Elimination of this eventuality therefore requires that the control mechanism distinguish between the advent of a lower temperature limit and element breakdown to effect system failure in safe condition in the latter circumstance.

An object of the present invention is to provide a simple and inexpensive control mechanism for heating equipment having inherent fail-safe features.

A further object is to determine safe operation of heating equipment between fixed temperature limits by regulating inlet flow of combustion gases.

Another object of the invention is to preclude runaway of the combustion process which may result from a malfunctioning control mechanism.

A still further object is to provide a valve operating control mechanism which will regulate inlet gas flow to maintain fixed temperature limits in heating equipment and which will also effect valve shut-off when there is a malfunction in the control mechanism.

Briefly, the present invention may be described as comprising a temperature sensitive bulb-bellows combination and spring means operatively positioned relative to the bellows which operate to effect regulation of combustion gas flow in response to a sensed temperature condition. Malfunction of the bulb-bellows system permits the spring means to move in the direction of decreased gas flow, thereby failing the system in the safe condition. Another bulb-bellows combination which is independent from the action of the spring means may be included when control from more than one temperature sensing location is desired.

The exact nature of this invention, which is susceptible to a variety of embodiments, only two of which are herein described, as well as other objects and advantages thereof, will become apparent from the following description considered in connection with the accompanying drawing wherein:

FIG. 1 is a schematic representation, with parts in section, of a heating unit utilizing an embodiment of the present invention; and FIG. 2 is a schematic representation of a second embodiment of the invention which may be utilized with the heating unit of FIG. 1.

As shown in the drawing, the control unit comprises a body 10 having a gas inlet tapping 12 and an outlet tapping 14, with a valve generally indicated at 16 positioned to control the quantity of gas flowing therethrough. The valve 16 is comprised of a valve disc 18 which is biased toward a valve seat 20 by a spring 22, and a snap mechanism which includes overcenter snap disc 24, movement multiplying levers 26, disc 28, operating plunger 30, seal diaphragm 32 and seal retainer 34. A contact button 36 actuated by rotation of a lever 38, which is biased in a clockwise direction about its pivot 42 by a spring 40, drives plunger 30 to actuate snap disc 24 and drive valve disc 18 downwardly to the valve-open position through the action of disc 28 upon levers 26 which engage a stud 21 threaded into the upper portion 19 of disc 18.

A furnace 44 includes a combustion chamber 46 in which is located a burner 48 receiving combustion gas from outlet tapping 14 by means of a suitable conduit 50. An opening 52 leading from chamber 46 receives the products of combustion and air for combustion is provided to chamber 46 through opening 53. A pilot burner 54 receives gas from a conduit 56 through a tapped valve 58 located in body 10. Extinguishment of pilot 54 is sensed by a thermocouple 60 which operates through the electrical connection of leads 62 to reduce the input to a solenoid 64, thereby permitting a spring 68 to overcome the magnetic forces of the solenoid 64 and drive the armature stem 66 against an extension 39 of lever 38 to rotate the lever in a counterclockwise direction against the force of spring 40. Thus, gas flow through the valve 16 is terminated and in order to reopen the valve 16, a button 70 is pushed driving the solenoid 64 against the action of a spring 72 to effect retraction of the armature stem 66. The button 70 is held in the pushed-in position until reignition of pilot 54 produces an effect in thermocouple 60 sufficient to generate a magnetic force in solenoid 64 which will overcome the forces of spring 68; at which time release of button 70 permits spring 72 to drive solenoid 64 to the right, thereby effecting clockwise rotation of lever 38 to open valve 16 if element 98 is in a position calling for heat.

Furnace 44 is provided with an inlet duct 74, through which air is received from the area to be heated, and an outlet duct 76 from which warm air is discharged. The cooler inlet air is drawn into the unit through a filter 78 by a blower 80 and passes through a plenum chamber 82 where it is heated and from which it is discharged to the outlet duct 76. A conventional thermostatic blower control unit 84, which includes a temperature sensitive bulb 86 positioned in the plenum chamber 82, is provided. The present invention is embodied in a control mechanism which regulates the flow of combustion gas through valve 16 in accordance with temperatures within the furnace 44 and a description of the structure and function of this mechanism will now be presented.

A temperature sensitive bulb 88 communicates through a suitable capillary tube 90 with a bellows 92 which is supported in the body 10 by an adjustment screw 94 and which expands when the temperature at bulb 88 increases to drive a T-bar 96 leftward against extension 39 thereby rotating the lever 38 counterclockwise to close valve 16. The bulb-bellows combination 88–92 may be filled with any suitable charging medium which contracts as the temperature at bulb 88 decreases, thereby causing bellows 92 to contract permitting lever 38 to be rotated clockwise by the action of spring 40 to open valve 16. The T-bar 96 is slidably supported on a pin 98 which extends through a slot 100 and on a pinion shaft 102 which is rotatably mounted in body 10 and which extends through a slot 104. A knob 106 is affixed to adjustment screw 94 and provides means for adjustably positioning the bellows 92.

A second temperature sensitive bulb 108, positioned within plenum chamber 82, communicates through a suitable capillary tube 110 with a bellows 112 which is supported in body 10 by an adjustment screw 114 and which expands when the temperature at bulb 108 increases to drive a toothed rack 116 against the left end of T-bar 96, thereby effecting counterclockwise rotation of lever 38 to close valve 16. A pinion gear 118 mounted on shaft 102 engages rack 116 and a second toothed rack 120 which is urged leftward by the force of a compressed spring 122 supported in body 10 by an adjustment screw 124.

The pinion shaft 102 is mounted in the sides of body 10 which are parallel to the plane of the drawing and it is constrained from lateral movement to insure that the toothed racks 116 and 120, which are slidably supported on the pins 126 extending through slots 128, move in parallel and opposite directions.

In the operation of the device, increased temperature at bulb 108 drives toothed rack 120 rightwardly against spring 122 by the action of the expanding bellows 112 which drives rack 116 leftwardly and pinion gear 118 in a counterclockwise direction. Contraction of bellows 112 permits spring 122 to reverse the direction of motion of the racks 116, 120 and gear 118 reestablishing the equilibrium therebetween and effecting a reopening of valve 16.

Operation of the fail-safe features of the invention arise as a result of a malfunction such as leakage in the temperature sensitive bulb-bellows system 108–112 which would preclude expansion of bellows 112 to close valve 16 when the temperature at bulb 108 increases. Runaway combustion is prevented by the action of spring 122 which drives rack 120 against T-bar 96 to close valve 16, thereby failing the entire system in the safe condition.

A second embodiment of the invention, shown in FIG. 2, may comprise a pair of temperature sensitive bulbs 130 and 132 respectively connected to a pair of bellows 134 and 136 by capillary tubes 138 and 140. Adjustable mounting for the bellows 134, 136 may be provided in a manner similar to that shown in FIG. 1, by the screws 142, 144 and knob 145. The bulb 130 is positioned in duct 74 to replace bulb 88 and increasing bulb temperature expands bellows 134 driving lever 38 counterclockwise to close valve 16.

The bulb 132 is positioned in plenum chamber 82 to replace bulb 108 and increasing bulb temperature expands bellows 136 driving an arm 146 and a gear 148 about a rotatably mounted shaft 150 against the action of a compressed spring 152. The extension 39 of lever 38 is formed with a protuberance 154 engaging a downwardly extending arm 156 which is driven clockwise with a gear 158 about a rotatably mounted shaft 160 by counterclockwise rotation of gear 148 which meshes with gear 158. Therefore, expansion of bellows 136 effects counterclockwise rotation of lever 38 through the interaction of protuberance 154 and arm 156 to close valve 16.

The fail-safe features of this embodiment of the invention arise when a malfunction such as leakage in the bulb-bellows system 132–136 causes excessive contraction of bellows 136. The spring 152 drives arm 146 and its downwardly directed extension 162 in a clockwise direction to close valve 16 through the interaction of protuberance 154 and extension 162 which effects counterclockwise rotation of lever 38, thereby failing the system in the safe condition in a manner similar to that set forth in the description of FIG. 1.

Choice of charging medium for the bulb-bellows systems 108–110–112 and 132–140–136, along with the adjustable positioning provided by screws 114, 124, 142 and 144, plays a significant role in determining the sensitivity of the system, and, although any suitable liquid medium may be used, a preferred charging medium may comprise a condensable vapor and a non-condensable gas, or a liquid charge and a non-condensable gas. The gas pressure would hold the bellows (112 or 136) in an extended position that is relatively independent of temperature, thereby establishing a point of bellows contraction beyond which operation of the fail-safe action of the spring (122 or 152) would occur. A suitable charge for the system in a domestic heating application could be a combination of refrigerant F–11 and an inert gas such as nitrogen.

In a typical domestic heating application, such as a warm air heating system, one temperature sensitive bulb (88 or 130) senses room demand to control fuel input in response to this demand; while the other bulb (108 or 132) located in the plenum chamber 82 of the furnace 44 serves to limit temperature to a safe level in the event of broken or slipping blower belts, clogged filters, etc., thus providing safety for the system regardless of the cause of malfunction and also providing protection against its own malfunction through the expedient of the fail-safe features.

It will be apparent that the number of bulb-bellows systems 88–90–92 or 130–138–134 utilized would depend upon the number of locations at which temperature control is desired, and that for single-location temperature control in the example of FIG. 1, the bulb-bellows system 88–90–92 and T-bar 96 could be deleted without impairing fail-safe control and operation.

Thus, it will be seen that utilization of the principles of the present invention provides dependable temperature control with immunity from malfunction dangers, in an uncomplicated and economical manner.

Although in the foregoing there has been disclosed two specific embodiments of the present invention, it will be apparent that the invention may find expression in a variety of other forms; therefore, it should be understood that it is intended that all matter contained in the foregoing description and shown on the drawing shall be interpreted as illustrative and not in a limiting sense.

What is claimed is:

1. In a control mechanism for a heating unit including a burner, the combination comprising means adapted to direct fuel flow to said burner, valve means actuatable to regulate the flow, temperature sensing means, bellows means expanding and contracting in response to said temperature sensing means, spring means, and connecting means including a pair of oppositely movable members operatively associated with said bellows means, said spring means and said valve means, said bellows means moving one of said movable members for actuating said valve means to regulate the flow of fuel in accordance with sensed temperature, said spring means opposing the action of said bellows means during expansion and complementing the action of said bellows during contraction, and said spring means moving the other of said movable member for actuating said valve means to cut off the fuel flow and fail safe when said bellows means contracts beyond a predetermined level, and said connecting means and its movable members comprise a pair of toothed racks and a pinion gear having opposite portions engaging said racks to limit motion thereof to opposite directions.

2. In a control mechanism for a heating unit including a burner, the combination comprising means adapted to direct fuel flow to said burner, valve means actuatable to regulate the flow, temperature sensing means, bellows means expanding and contracting in response to said temperature sensing means, spring means, and connecting means including a pair of oppositely movable members operatively associated with said bellows means, said spring means and said valve means, said bellows means moving one of said movable members for actuating said valve means to regulate the flow of fuel in accordance with sensed temperature, said spring means opposing the action of said bellows means during expansion and complementing the action of said bellows during contraction, and said spring means moving the other of said movable member for actuating said valve means to cut off the fuel flow and fail safe when said bellows means contracts beyond a predetermined level, and said connecting means and its movable members comprise a pair of meshed gears and a pair of arms respectively connected to rotate with said gears.

3. The combination as recited in claim 1 wherein one of said toothed racks is engaged by said bellows means and the other of said racks is engaged by said spring means.

4. The combination as recited in claim 2 wherein one of said arms is engaged by said bellows means and said spring means, and wherein said meshed gears rotate in opposite directions.

5. In a control mechanism for a heating unit including a burner, the combination comprising means adapted to direct a fuel flow to said burner, a valve actuatable to regulate the fuel flow, a lever pivotable to actuate said valve, first temperature sensing means, a first bellows expandable and contractable in response to said first temperature sensing means, a first toothed rack, a second toothed rack, a pinion gear meshing with said first and second racks and limiting motion thereof to opposite directions, said first bellows engaging said first rack, a first spring engaging said second rack to oppose action of said bellows during expansion thereof and complement action of said bellows during contraction thereof, second temperature sensing means, a second bellows expandable and contractable in response to said second temperature sensing means, a slidably mounted T-bar engaging said lever to close said valve upon expansion of said second bellows, a second spring biasing said lever to open said valve, said first rack driving said T-bar against said lever to close said valve upon expansion of said first bellows, said second rack driving said T-bar to close said valve when said first bellows contracts beyond a predetermined level.

6. In a control mechanism for a heating unit including a burner, the combination comprising means adapted to direct a fuel flow to said burner, a valve actuatable to regulate the fuel flow, a lever pivotable to actuate said valve, first temperature sensing means, a first bellows expandable and contractable in response to said first temperature sensing means, a first and a second gear meshed to rotate in opposite directions, a first spring operatively positioned to oppose action of said first bellows during expansion thereof and to complement action of said first bellows during contraction thereof, a second spring biasing said lever to open said valve, a first arm rotatably driving said first gear and engaging said first bellows, said first spring and said lever to effect fuel flow regulation in accordance with temperature sensed by said first sensing means, a second arm rotatably driven by said second gear and engaging said lever to close said valve when said first bellows contracts beyond a predetermined point, second temperature sensing means, a second bellows expandable and contractable in response to said second temperature sensing means and engaging said lever to effect fuel flow regulation in accordance with temperature sensed by said second sensing means.

7. In a control device for controlling the operation of a burner unit, the combination comprising valve means adapted to control a flow of fuel to the burner unit, lever means actuating said valve means between open and closed positions, spring means operatively associated with said lever means and normally biasing the same to its valve open position, means sensing conditions produced by the burner unit, expanding and contracting means operable in response to said sensing means, movable means operatively disposed between said expanding and contracting means and said lever means for actuating the same, resilient means exerting a force on said movable means, said expanding and contracting means exerting an opposite force on said movable means whereby a resultant force thereon effects movement of said movable means to actuate said lever means between valve open and closed positions, said movable means including a pair of movable members and an operative connection therebetween for moving said movable members in different directions, one of said movable members actuating said lever means between its valve open and closed positions in response to operation of said expanding and contracting means, the other of said movable members actuating said lever means to its valve closed position in response to abnormal contraction of said expanding and contracting means whereby said valve means cuts off the flow of fuel to the burner unit upon malfunction of said expanding and contracting means.

8. The combination as recited in claim 7 wherein said movable members include a pair of toothed racks, one of said racks engaging said expanding and contracting means and the other of said racks engaging said resilient means, and said operative connection includes a pinion gear having opposite sides operatively engaging said pair of toothed racks to limit motion thereof to opposite directions.

9. The combination as recited in claim 7 wherein said movable members include a pair of movable arms, one of said arms engagingly disposed between said resilient means and said expanding and contracting means and the other of said arms engaging said lever means, and said operative connection includes a pair of meshed gears connected to said pair of movable arms to limit motion thereof to opposite directions.

References Cited by the Examiner
UNITED STATES PATENTS

| | | | |
|---|---|---|---|
| 1,920,458 | 8/33 | Bast. | |
| 1,980,789 | 11/34 | Dillman | 236—91 |
| 1,994,983 | 3/35 | De Florez et al. | 158—28 |
| 2,095,358 | 10/37 | Dube | 236—34 |
| 2,186,984 | 1/40 | McCloy. | |
| 2,387,793 | 10/45 | Holmes | 236—99 |
| 2,457,378 | 12/48 | Johnson et al. | 158—28 |
| 2,527,622 | 10/50 | Dibert | 236—99 |
| 2,586,972 | 2/52 | McKenzie | 236—91 |
| 2,837,287 | 6/58 | Miller et al. | 236—21 X |
| 2,862,666 | 12/58 | Kriechbaum | 236—11 |

EDWARD J. MICHAEL, *Primary Examiner.*

ALDEN D. STEWART, *Examiner.*